United States Patent
Shaw et al.

(10) Patent No.: US 9,374,309 B2
(45) Date of Patent: Jun. 21, 2016

(54) SERVER CONTROLLED ROUTING SYSTEM

(71) Applicant: Facebook, Inc., Menlo Park, CA (US)

(72) Inventors: Stephen Shaw, Mountain View, CA (US); Lisa Guo, Los Altos, CA (US)

(73) Assignee: Facebook, Inc., Menlo Park, CA (US)

( * ) Notice: Subject to any disclaimer, the term of this patent is extended or adjusted under 35 U.S.C. 154(b) by 385 days.

(21) Appl. No.: 13/863,602

(22) Filed: Apr. 16, 2013

(65) Prior Publication Data

US 2014/0310427 A1    Oct. 16, 2014

(51) Int. Cl.
 *G06F 15/173* (2006.01)
 *H04L 12/803* (2013.01)
 *H04L 12/715* (2013.01)

(52) U.S. Cl.
 CPC .............. *H04L 47/125* (2013.01); *H04L 45/04* (2013.01)

(58) Field of Classification Search
 CPC .............................. H04L 47/125; H04L 45/04
 USPC ....................................................... 709/244
 See application file for complete search history.

(56) References Cited

U.S. PATENT DOCUMENTS

| | | | | |
|---|---|---|---|---|
| 6,483,833 B1 * | 11/2002 | Jagannath | ............... | H04L 45/00 370/392 |
| 7,522,603 B2 | 4/2009 | Vasseur | | |
| 2004/0017796 A1 * | 1/2004 | Lemieux | ................. | H04L 45/04 370/349 |
| 2005/0071469 A1 * | 3/2005 | McCollom | .......... | H04L 67/1002 709/225 |
| 2006/0120288 A1 | 6/2006 | Vasseur et al. | | |
| 2006/0165009 A1 | 7/2006 | Nguyen et al. | | |
| 2006/0262735 A1 | 11/2006 | Guichard et al. | | |
| 2009/0157850 A1 | 6/2009 | Gagliardi et al. | | |
| 2011/0110248 A1 | 5/2011 | Koitabashi et al. | | |
| 2012/0179830 A1 | 7/2012 | Ait-Ameur et al. | | |

OTHER PUBLICATIONS

European Search Report for European Application No. 14164426.0, mailing date Jul. 14, 2014, 8 pages.
Hawkinson BBN Planet T Bates MCI J: "Guidelines for creation, selection, and registration of an Autonomous System (AS); rfc1930. txt", Mar. 1, 1996.
International Search Report and Written Opinion for International Application No. PCT/US2014/033073, mailing date Jul. 30, 2014, 14 pages.

* cited by examiner

*Primary Examiner* — Jude Jean Gilles
*Assistant Examiner* — Jaren M Means
(74) *Attorney, Agent, or Firm* — Perkins Coie LLP (57) ABSTRACT

A method of operating a content distribution system with a server controlled routing mechanism is disclosed. The method includes: collecting prefix entries from an autonomous system; receiving a content request to send a particular digital content to a prefix; generating, at a host server, an opaque label based on the autonomous system for an Internet protocol (IP) packet of the digital content when the prefix is listed in the prefix entries collected from the autonomous systems; and forwarding the IP packet out of an egress interface of a network equipment, the egress interface associated with the opaque label.

20 Claims, 7 Drawing Sheets

SERVER CONTROLLED ROUTING SYSTEM

FIELD OF INVENTION

This invention relates generally to a content distribution system, and in particular to a network routing mechanism for the content distribution system.

BACKGROUND

Internet services of today are deploying more and more traffic sources from a network perspective with regards to content delivery networks (CDNs) at the network edges. A local network fabric at an Internet point of presence (PoP) requires expensive network devices/equipments to facilitate outbound traffic. Network protocols, such as border gateway protocol (BGP), connect these content distribution servers to various autonomous systems (ASs). Amongst the ASs, prefixes or other reachability information are exchanged to make core routing decisions. The network protocols employing simple route selection algorithms, such as best path, have no intelligence to accommodate high traffic scenarios where some of the ASs are overloading their bandwidths.

SUMMARY

The techniques disclosed herein enable routing decisions to be shifted from a network equipment/device, such as a router, at edges of a service network to the host servers of the service network. The techniques disclosed change the way network equipments forward IP packets out of a content distribution system. Under a conventional routing scheme, the network equipments make independent forwarding decisions based on configurable preferences. Here, the content distribution system can modify the routing scheme such that Internet Protocol (IP) packets are forwarded based on opaque labels, and not based on calculation of a route at the network equipment. The calculation of the route based on a destination IP address/prefix is done at the host servers of the network fabric. Because the routing decisions are shifted to the host servers, the content distribution system saves valuable costs on the network equipments due to the reduced network equipment functionality requirements.

The techniques disclosed herein also enable a content distribution system with conditional routing capability in addition to having configurable preferences of routes. The conditional routing policies can be based on network utilization. The network conditionals can be monitored in real-time. For example, the content distribution system can shift traffic from one link at 80% of its capacity to a secondary link by changing the opaque label policy in the host servers. Without the ability to shift traffic from one link to another based on network utilization, the entire content distribution network fabric would be limited by the least common denominator of the lowest capacity/bandwidth link. The disclosed conditionals based on the network utilization data enable the content distribution system to monitor and manage the network traffic level in a responsive and granular level.

Some embodiments have other aspects, elements, features, and steps in addition to or in place of what is described above. These potential additions and replacements are described throughout the rest of the specification

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
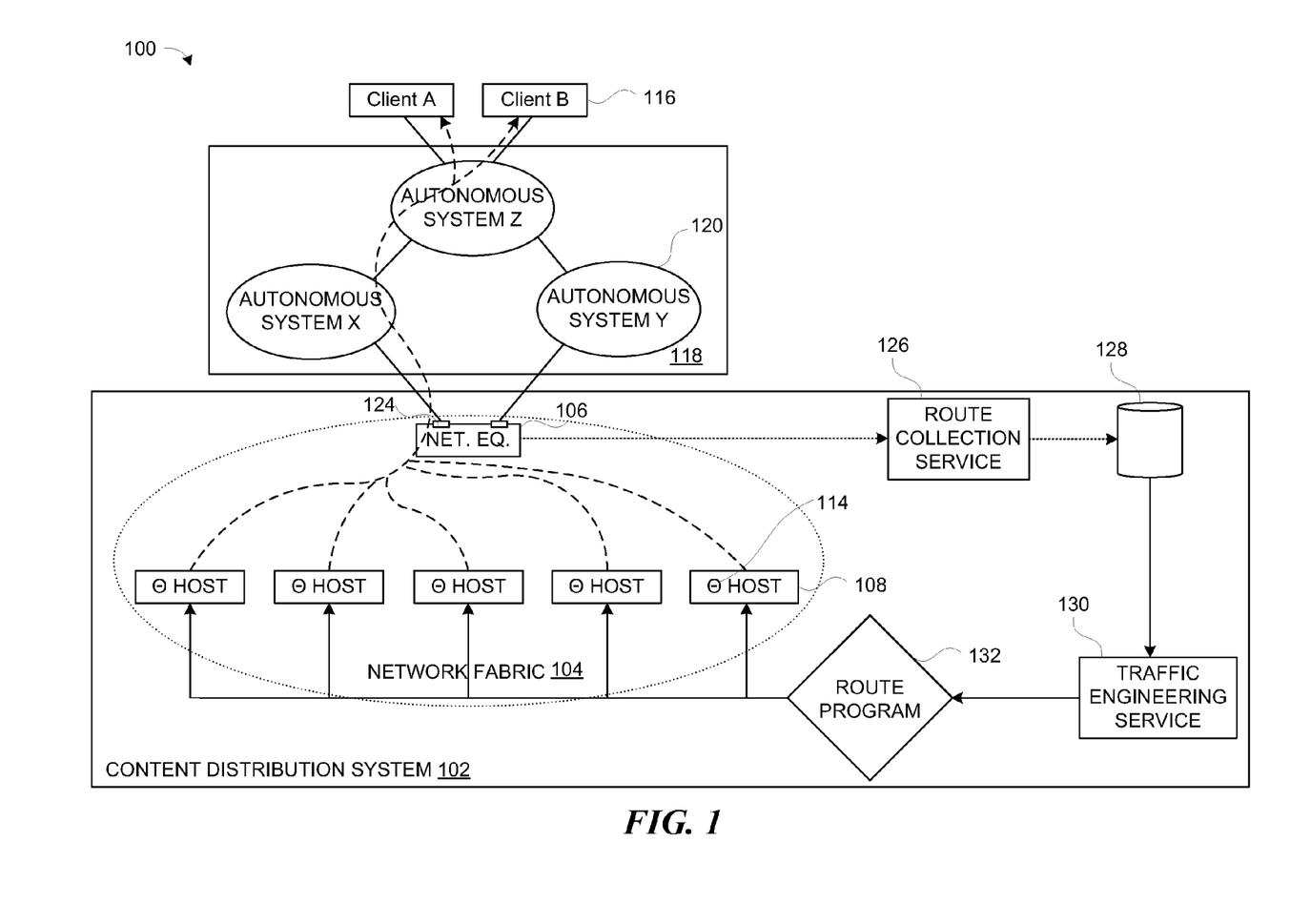
FIG. 1 illustrates an example a control flow of a system environment for operating a content distribution system with a server-controlled routing mechanism.

FIG. 1 illustrates a control flow of a system environment 100 for operating an example of a content distribution system 102 with a server-controlled routing mechanism. The content distribution system 102 may be part of an Internet point of presence (PoP). The content distribution system 102 is formed from a network fabric 104 where network nodes connect with each other and to external systems via one or more network equipments 106. The network nodes can each be a host server 108. The host server 108 is a computer server. The computer server can be a computer system as described in FIG. 6. The network equipments 106 are computer networking devices for mediating data in a computer network. For example, the network equipments 106 can include routers, gateways, network bridges, switches, hubs, repeaters, proxies, network interface controllers, or any combination thereof.

The host server 108 includes a non-transitory memory to store a content service application 114 and a processor to execute the content service application 114. A client device 116 outside of the content distribution system 102 can send a request for digital content to the content distribution system 102. If the content is accessible by the host server 108, the content service application 114 on the host server 108 forwards the digital content from the host server 108 to the client device 116. The digital content travels as IP packets across Internet service providers 118 including one or more autonomous systems 120. An autonomous system 120 is a collection of connected IP routing prefixes under the control of at least one network operator that presents a common, clearly defined routing policy to the Internet. The client device 116 is an electronic device capable of accessing the Internet. For example, the client device 116 may be a desktop computer, a laptop, a tablet, a TV, a set top box, a video game console, a mobile phone, or any combination thereof.

The content distribution system 102 can include one or more methods of generating opaque labels to inform the network equipment 106 to forward an IP packet through a particular egress port 124. The one or more methods can be implemented by modules and stores described herein. The modules can be implemented as hardware components, software modules, or any combination thereof. For example, the modules described can be software modules implemented as instructions on a non-transitory memory capable of being executed by a processor or a controller on a machine described in FIG. 6. The stores are formatted storage spaces on one or more storage devices. The stores can be accessible by the processor or the controller executing each of the modules.

Each of the modules can operate individually and independently of other modules. Some or all of the modules can be executed on the same host server. Some or all of the modules can be combined as one module. A single module can also be divided into sub-modules, each sub-module performing separate method step or method steps of the single module. The modules can share access to a memory space. One module can access data accessed by or transformed by another module. The modules can be considered "coupled" to one another if they share a physical connection or a virtual connection, directly or indirectly, allowing data accessed or modified from one module to be accessed in another module.

The content distribution system 102 can include additional, fewer, or different modules for various applications. Conventional components such as network interfaces, security functions, load balancers, failover servers, management and network operations consoles, and the like are not shown so as to not obscure the details of the system. The module(s) can run on one of the host servers serving content, or on one or more of host servers dedicated to the functionalities of the module(s).

The content distribution system 102 includes a route collection service module 126. The route collection service module 126 collects route information, such as BGP information, from or through the network equipment 106 and stores the route information in a prefix store 128. Each of the autonomous systems 120 advertises prefix entries that can be reached via the autonomous system 120. The route information includes a prefix table associating prefixes with each of the autonomous systems 120 neighboring the network equipment 106. A network prefix is an Internet address that signifies the IP location of a set of systems. The network prefix can be a portion of an IP address that can be selected by logically ANDing a subnet mask with the IP address. Each of the autonomous systems 120 is in turn associated with a particular egress port 124 of the network equipment 106. The prefix store 128 can be kept offline. The prefix store 128 can be updated in real-time.

The route collection service module 126 can be implemented as a BGP speaker. In one example, a BGP session can exist on the network equipment 106. The network equipment 106 can pawn certain packets off to an offline server, such as IPv6 Neighbor Discovery, along with anything sourced from Transmission Control Protocol (TCP) port 179. The route collection service module 126 can then act as the BGP speaker amongst the autonomous systems 120 neighboring the network equipment 106. The route collection service module 126 can be transparent to the network equipment 106 in between the autonomous systems 120.

The route collection service module 126 enables the content distribution system 102 to take every prefix that is learned on the Internet and to store the prefix entries offline from the network equipment 106. The stored prefix entries can be multiple full Internet route tables, where these tables can be used for path determination by a traffic engineering service module 130 of the content distribution system 102.

The traffic engineering service module 130 is a module of the content distribution system 102 for generating routes to specific prefixes. From the prefix store 128, the traffic engineering service module 130 can determine the default egress port for each prefix. Each egress port has a corresponding opaque label. The traffic engineering service module 130 can provide an interface for a system administrator to modify the default egress port for each prefix. Without external intervention, the traffic engineering service module 130 may program all of the routes learned from peers of the network fabric 104 (e.g., the autonomous systems 120) into host servers 108 within the network fabric 104 (e.g., a PoP). Once the traffic engineering service module 130 determines which egress port to associate with each prefix, the traffic engineering service module 130 can update that information to the host servers 108 via a route program module 132.

The route program module 132 is a module in the content distribution system 102 for providing programming of routes to the host servers 108 in the network fabric 104. The routes are in the form of opaque labels associated with potential destination prefixes. The route program module 132 can run on one of the host servers 108 on the network fabric 104 or be part of each of the host servers 108 serving traffic. The host server 108 receives instructions from the route program module 132 to assign opaque labels associated with specific destination prefixes to the IP packets of the digital content delivered out of the host server 108. An IP packet has an opaque label assigned by the host server 108 dictating to the network equipment 106 which of the particular egress port 124 to forward the IP packet.

The network equipment 106 stores a translation table of the opaque labels on its memory, such as its ternary content addressable memory (TCAM). Each of the opaque labels corresponds to an egress port 124 of the network equipment 106. A copy of the translation table can also be accessible by the traffic engineering service module 130 when determining associations between potential destination prefixes and opaque labels.

The content distribution system 102 disclosed herein enables the routing decisions to be shifted to the host servers. The content distribution system 102 saves valuable costs on the network equipment due to the reduced network equipment functionality requirements. Conventional network equipments have to hold a full Internet routing table. However, because routing decisions are shifted to the host servers, the network equipment 106 in the content distribution system 102 would not need the additional memory and processing power to hold and use the full Internet routing table. The network equipments 106 are required only to forward IP packets based on an opaque label. The content distribution system 102 enables capital expenditure (CAPEX) savings when building the network fabric 104. The network equipment 106 can be simplified to a switch, a generic routing encapsulation (GRE) tunnel base, or a Packet over Synchronous Optical Networking (POS) base.

Figure 2:
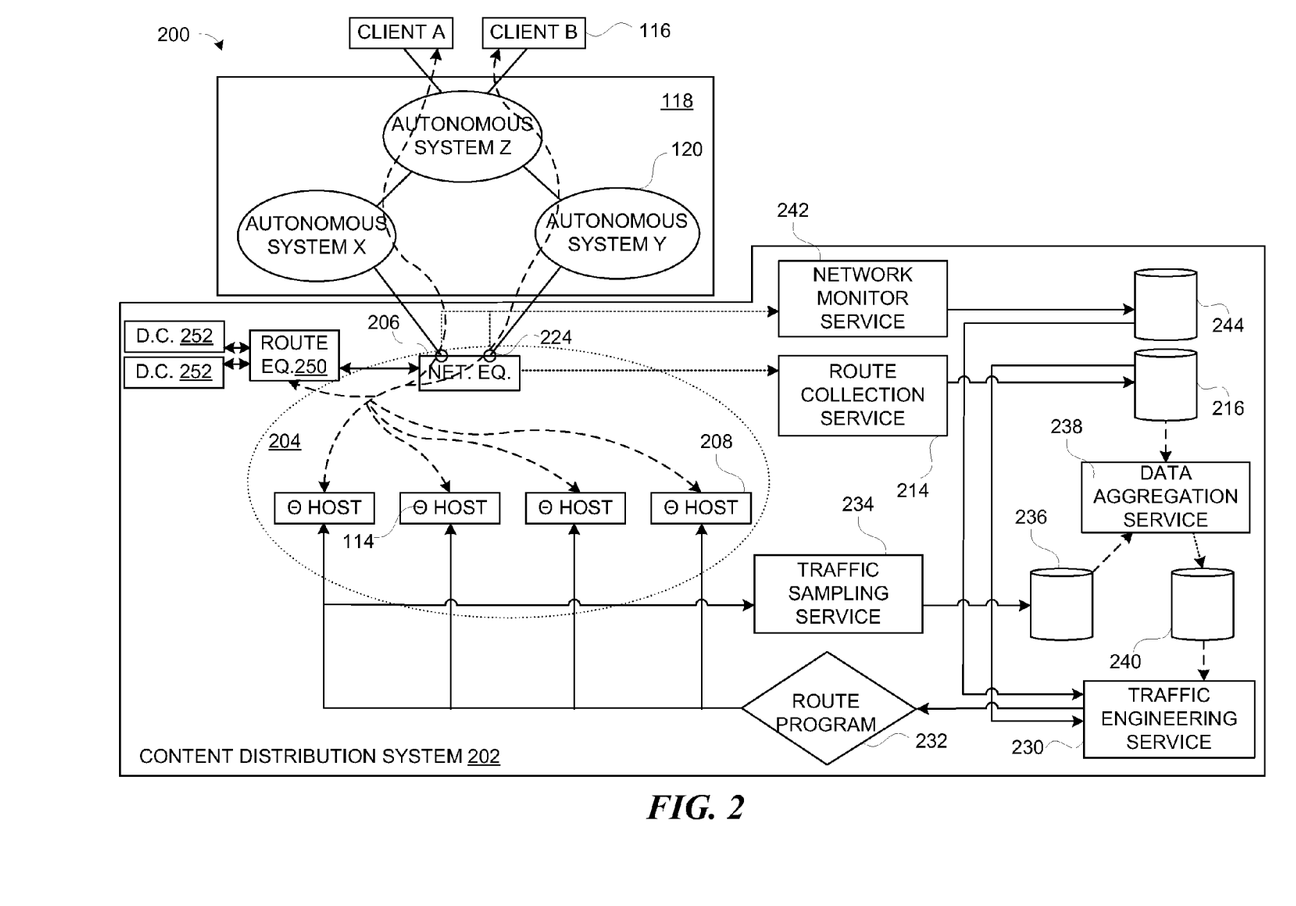
FIG. 2 illustrates another example of a control flow of a system environment for operating a content distribution system with a server-controlled routing mechanism.

FIG. 2 illustrates a control flow of a system environment 200 for operating another example of a content distribution system 202 with a server-controlled routing mechanism. The content distribution system 202 may include the content distribution system 102 of FIG. 1. The content distribution system 202 may be part of an Internet point of presence (PoP). The content distribution system 202 is formed from a network fabric 204 where network nodes connect with each other and external systems via one or more network equipments 206. The network fabric 204 can be the network fabric 104 of FIG. 1. The network equipments 206 can be the network equipment 106 of FIG. 1. The network nodes can each be a host server 208. The host server 208 is a computer server, such as the host server 108 of FIG. 1. The computer server can be a computer as described in FIG. 6.

Similar to the host server 108, the host server 208 includes a non-transitory memory to store the content service application 114 and a processor to execute the content service application 114. The client device 116 outside of the content distribution system 202 can send a request for digital content to the content distribution system 202. If the content is accessible by the host server 208, the content service application 114 on the host server 208 forwards the digital content to the client device 116. The digital content travels as IP packets across the Internet service providers 118 including one or more the autonomous systems 120.

The content distribution system 202 can include one or more methods of generating opaque labels based on network conditions to inform the network equipments 206 to forward an IP packet through an egress port 224. The one or more methods can be implemented by modules and stores described herein. The modules can be implemented as hardware components, software modules, or any combination thereof. For example, the modules described can be software modules implemented as instructions on a non-transitory memory capable of being executed by a processor or a controller on a machine described in FIG. 6. The stores are formatted storage spaces on one or more storage devices. The stores can be accessible by the processor or the controller executing each of the modules.

Each of the modules can operate individually and independently of other modules. Some or all of the modules can be executed on the same host server. Some or all of the modules can be combined as one module. A single module can also be divided into sub-modules, each sub-module performing separate method step or method steps of the single module. The modules can share access to a memory space. One module can access data accessed by or transformed by another module. The modules can be considered "coupled" to one another if they share a physical connection or a virtual connection, directly or indirectly, allowing data accessed or modified from one module to be accessed in another module.

The content distribution system 202 can include additional, fewer, or different modules for various applications. Conventional components such as network interfaces, security functions, load balancers, failover servers, management and network operations consoles, and the like are not shown so as to not obscure the details of the system. The module(s) can run on one of the host servers serving content, or on one or more of host servers dedicated to the functionalities of the module(s).

The content distribution system 202 includes the route collection service module 126 and the prefix store 128 as described in FIG. 1. The content distribution system 202 also includes a traffic engineering service module 230. The traffic engineering service module 230 is a module of the content distribution system 102 for modifying routes of IP packets to specific prefixes based on network conditionals. The network conditionals can be stored on the traffic engineering service module 230, containing business logics of making the final decision of where to forward outgoing IP packets for the host servers 208 of the network fabric 204.

Initially from the prefix store 128, the traffic engineering service module 230 can determine the default egress port for each prefix. The traffic engineering service module 230 can program all of the routes learned from peers of the network fabric 204 (e.g., the autonomous systems 120) from the prefix store 128 into the host servers 208 within the network fabric 204 (e.g., a PoP) via a route program module 232, such as the route program module 123 of FIG. 1.

The content distribution system 202 further includes a traffic sampling service module 234. The traffic sampling service module 234 samples IP packets sent from each of the host servers 208. Information from the outgoing IP packets are captured including IP source address, port number, next IP address, and etc. Based on the time and frequency that the traffic sampling service module 234 collects information on the outgoing IP packets and the size amount of the IP packets, the traffic sampling service module 234 can normalize the bits per second into bandwidth utilization to be stored in a network utilization store 236. The traffic sampling service module 234 has the flexibility of changing the sampling rate of the host servers. When the traffic sampling service module 234 is determining network utilization or traffic trend, the traffic sampling service module 234 can have a lower sampling rate. When the traffic sampling service module 234 is used to debug a network problem, then the traffic sampling service module 234 can sample at a higher sampling rate to get more visibility and more accurate data.

Alternatively, the traffic sampling service module 234 can run a NetFlow™ on the network to monitor the IP traffic going in and out of the network fabric 204. Other technologies can be used to monitor or sample traffic, such as sFlow, which is a technology for monitoring network and host devices. The traffic sampling service module 234 can run a number of traffic sampling and traffic monitoring services, and normalize the final bandwidth utilization data. The bandwidth utilization data can be organized by the 5-tuple of the IP packets sampled. The 5-tuples identities a source IP address, a source port number, a destination IP address, a destination port number, and a protocol type, such as the TCP.

The traffic sampling service module 234 can not only monitor the outgoing IP packets, but can also monitor the inter-host traffic within the network fabric 204. For example, the traffic that runs between clusters of host servers and server racks can also be tracked.

Bandwidth utilization data in the network utilization store 236 and prefix entries from the prefix store 128 are aggregated via a data aggregation service module 238 into a traffic map store 240. The data aggregation service module 238 pair the prefix entries from the prefix store 128 with the bandwidth utilization data from each prefix to determine how much traffic the network fabric 204 is sending to a particular prefix. The traffic map store 240 allows for filtering and sorting of the network utilization data per prefix, such as determining the top N utilized prefix through a network equipment 206. The bandwidth utilization data may be sampled based on 5-tuples. The destination IP addresses can be aggregated into network prefixes. Hence, the pairing between the prefix entries and the destination IP address in the 5-tuples allows the bandwidth utilization data to be organized by prefix. The traffic map store 240 can include information about how much data is sent from which host to each of the known prefixes in the prefix store 128.

The content distribution system 202 includes a network monitor service module 242 coupled to the network equipment 206. The network monitor service module 242 monitors the network equipments 206 at the edge of the network fabric 204. For example, the network monitor service module 242 can monitor the ingress and egress interfaces of each of the network equipments 206 to determine how much traffic is going to and coming from each of the autonomous systems 120 neighboring each of the network equipments 206. How much traffic is going to and coming from each of the autonomous systems 120 are stored in a network interface traffic store 244.

The traffic engineering service module 230 enables the content distribution system 202 to change the opaque labels of outgoing IP packets based on the traffic map organized by destination prefixes stored in the traffic map store 240. With the data stored in the network interface traffic store 244 and/or additional profile information about the autonomous systems 120 from the traffic map store 240, the traffic engineering service module 230 can determine the capacity load on each of the autonomous systems 120. When the capacity load is beyond a certain percentage, the traffic engineering service module 230 can be set to a traffic relief mode. In the traffic relief mode, the traffic engineering service module 230 can move traffic per prefix going to one of the autonomous systems 120 to another associating a different egress port with the prefix.

Once the traffic engineering service module 230 determines which egress port to associate with each prefix, the traffic engineering service module 230 can update that information to the host servers 208 through the route program module 232. The route program module 232 is a module in the content distribution system 202 for providing programming of routes to the host servers 208 in the network fabric 204. For different host servers 208, the routes for the same prefix may be different depending on the traffic manipulating policies of the traffic engineering service module 230. The routes are in the form of opaque labels associated with potential destination prefixes. The route program module 232 can run on one of the host servers 208 on the network fabric 204 or be part of each of the host servers 208 serving traffic. The host server 208 receives instructions from the route program module 232 to assign opaque labels, associated with specific destination prefixes (i.e., destination of the client requesting the digital content), to the IP packets of the digital content delivered out of the host server 208. An IP packet has an opaque label assigned by the host server 208 dictating to the network equipment 206 which of the particular egress port 224 to forward the IP packet.

The network equipment 206, similar to the network equipment 106, stores a translation table of the opaque labels on its memory, such as its ternary content addressable memory (TCAM). Each of the opaque labels corresponds to the egress port 224 of the network equipment 206. A copy of the translation table can be accessible by the traffic engineering service 230.

The content distribution system 202 can also include a data center routing equipment 250. The host servers 208 of the network fabric 204 frequently may need to fetch data from a data center 252, such as content delivery network (CDN) data centers. The route collection service module 126 enables reduction of functionality requirements for the network equipment 206. However, when the network equipment 206 has reduced functionality, the data center routing equipment 250 may be needed to locate the data center 252 needed to source contents for each of the host servers 208. The data center routing equipment 250 can be connected directly with the host servers 208 themselves and/or the network equipment 206. The data center routing equipment 250 can serve as an intelligence device, capable of doing IP lookups, that can deliver data fetch requests to the data center 252 and route the fetch content correctly through the network equipment 206.

Similar to the content distribution system 102, the content distribution system 202 disclosed herein enables the routing decisions to be shifted to the host servers. Hence, the content distribution system 202 similarly enables capital expenditure (CAPEX) savings when building the network fabric 204. Moreover, the content distribution system 202 disclosed herein enables an effective network management that avoids over capacity of neighboring autonomous systems. By avoiding dropping of traffics, the content distribution system 202 enables better network performance and hence achieving operational expenditure (OPEX) savings.

The techniques introduced in the modules of FIG. 1 and FIG. 2 herein can be implemented by programmable circuitry programmed or configured by software and/or firmware, or they can be implemented by entirely by special-purpose "hardwired" circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

Figure 3A:
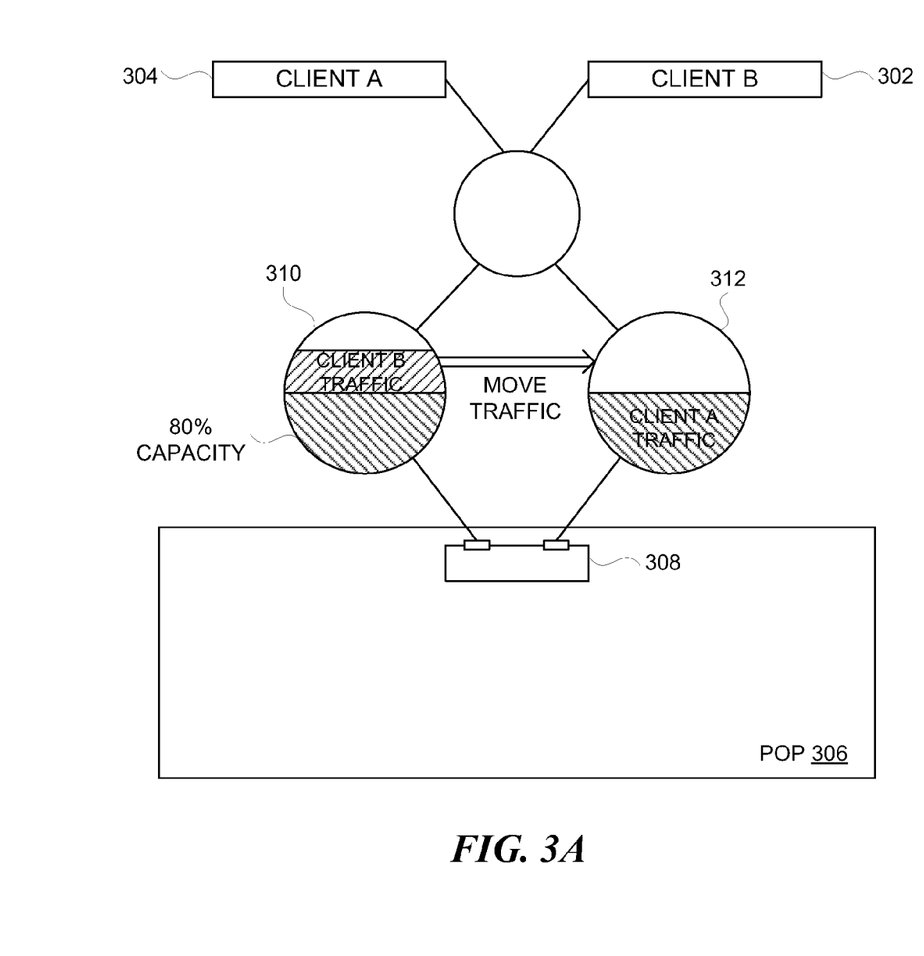
FIG. 3A illustrates an example of how the content distribution system can manipulate traffic for a client B without the traffic backing a client A.

FIG. 3A illustrates an example of how the content distribution system 202 can manipulate traffic for a client B 302 without the traffic backing a client A 304. In this example, a PoP 306 is connected via a network equipment 308 to an autonomous system X 310 and an autonomous system Y 312. The PoP 306 can be the network fabric 204 of FIG. 2 and the network equipment 308 can be the network equipment 206 of FIG. 2.

The autonomous system X 310 can have a capacity of 10 gigabits per second (Gbps) and the autonomous system Y 312 can have a capacity of 20 Gbps. As illustrated, the autonomous system X 310 is running at its 80% capacity. The content distribution system 202 can have a conditional stored in the traffic engineering service module 230 to move traffic away from the autonomous system X 310, if possible, when one of the links connected to the network equipment 308 is at or beyond 80% capacity.

The data aggregation service module 238 provides to the traffic engineering service module 230 how much traffic is being sent from which host to each prefix through which autonomous system. As illustrated, the client B 302 has a 4 Gbps traffic currently routing through the autonomous system X 310 and the client A 304 has a 10 Gbps traffic currently routing through the autonomous system Y 312. The prefix store 128 of FIG. 1 and FIG. 2 provides information on which alternative egress ports aside from the autonomous system X 310 can reach the client B 302. In this example, it is determined that the autonomous system Y 312 is an alternative egress port. Once that is known, the traffic engineering service module 230 can move the entire 4 Gbps traffic to the client B 302 from the autonomous system X 310 to the autonomous system Y 312. Alternatively, in order not to overburden the autonomous system Y 312 as a result of relieving the autonomous system X 310, the traffic engineering service module 230 can shift only a portion of the client B 302 traffic, such as a 2 Gbps of traffic, from the autonomous system X 310 to the autonomous system Y 312, and thus balancing the load on the autonomous system X 310 and the autonomous system Y 312. This can be achieved by programming the host servers serving the portion of traffic to assign an opaque label indicating an egress port of the autonomous system Y 312 to all its IP packets.

Figure 3B:
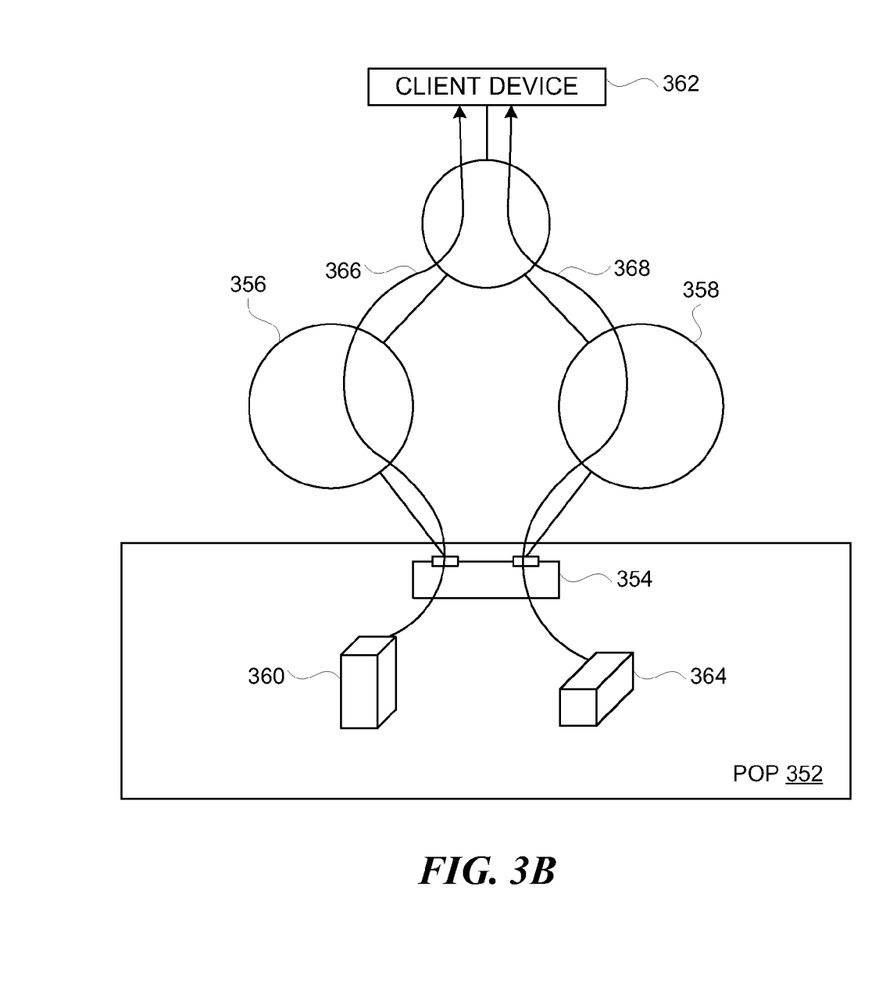
FIG. 3B illustrates an example of how the content distribution system can manipulate traffic based on traffic categorization.

FIG. 3B illustrates an example of how the content distribution system 202 can manipulate traffic based on traffic categorization. A PoP 352 is illustrated to include a network equipment 354 connecting the PoP 352 with neighboring autonomous systems. The PoP 352 can serve different types of traffic. For example, the PoP 352 can serve dynamic traffic, which is basic rendering of websites, and CDN traffic, which is traffic for repeatedly requested contents, such as audio files, photos, or videos. Because CDN traffic is typically less latency sensitive (i.e., people are used to waiting for a video or an audio stream to load), the traffic engineering service module 230 can move and manipulate traffic to ensure a priority that the majority of dynamic traffic, instead of the CDN traffic, is moved to a neighboring autonomous system having a lower latency.

In the example, the PoP 352 neighbors an autonomous system C 356 and an autonomous system D 358. The autonomous system C 356 has a lower latency while the autonomous system D 358 has a higher latency. The traffic engineering service module 230 can program the host servers within the PoP 352 to set an opaque label for a particular class of traffic. For example, a dynamic traffic host 360 is a host server serving basic website information to client devices 362 and a CDN traffic host 364 is a host server serving video streams. The dynamic traffic host 360 can be programmed to label its outgoing IP packets with an opaque label corresponding to the autonomous system C 356 and the CDN traffic host 364 can be programmed to label its outgoing IP packets with an opaque label corresponding to the autonomous system D 358. Alternatively, the traffic engineering service module 230 can program the network equipment 354 directly to set opaque labels on a particular type of traffic detected.

Latency of the autonomous systems can be detected in a number of ways. For example, latency can be tested from the client side. The client devices 362 can include a piece of client-side script, such as Asynchronous JavaScript and XML (AJAX) code, that triggers the client devices 362 to request a small piece of digital content, such as a 1 kilobyte image, from a number of PoPs. The client-side code allows the client devices 362 to select the PoPS with the lowest latency. For example, once the PoP 352 is selected by the client-side code, the host servers in the PoP 352 can coordinate with the client-side script to determine the latency and performance of the autonomous systems connected to the PoP 352. Test IP packets to the client-side code can be sent from the PoP 352 by specifically selecting certain autonomous systems for forwarding the test IP packets with specific opaque labels (i.e., the opaque labels determining the egress ports that connect to the selected autonomous systems). The latency reported by the client-side script can then be correlated with the selected autonomous systems. Other types of performance tests can be done via the network equipment 354 or directly from the host servers of the PoP 352, including round trip latency data and outgoing latency data. These latency/performance data can be fed into the traffic engineering service module 230 to determine how to manipulate the traffic going out of the PoP 352.

Figure 4:
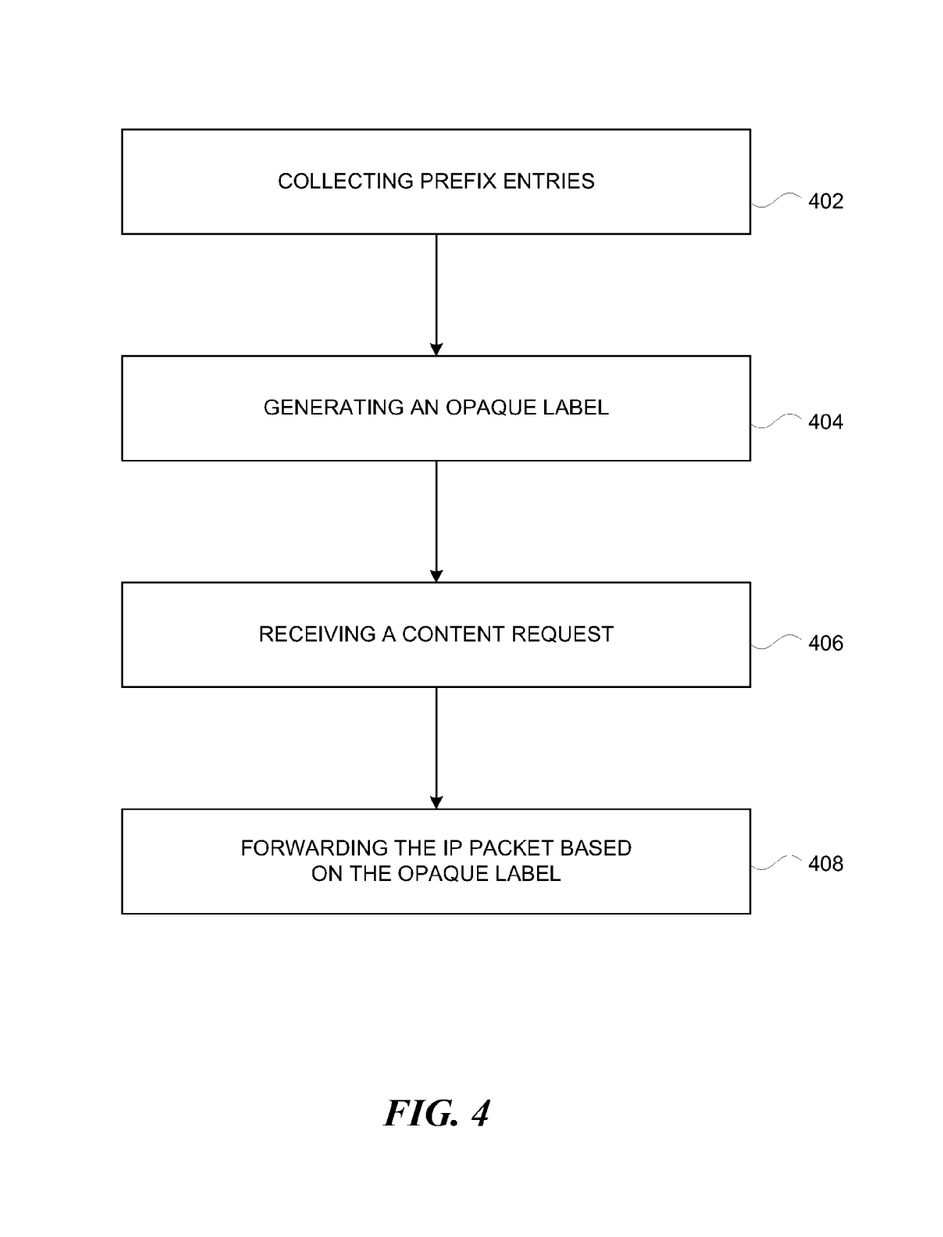
FIG. 4 illustrates a flow chart of a method of operating a content distribution system with server-controlled routing mechanism.

FIG. 4 illustrates a flow chart of a method 400 of operating a network managed content distribution system, such as the content distribution system 102, with server-controlled routing mechanism. The method 400 starts with a step 402 of collecting prefix entries through a network equipment from an autonomous system, the prefix entries associated with the autonomous system. The collected prefix entries can be stored offline from the network equipment. When the prefix is one of the collected prefix entries from the autonomous system, an opaque label is generated for an IP packet of the digital content at a step 404. The opaque label is associated with an egress interface of the network equipment directly connected to the autonomous system. The opaque label is generated based on the prefix of the content request and the autonomous system associated with the prefix in the prefix entries. The opaque label can be generated on a host server in the network managed content distribution system.

At some point, a content request to send a particular digital content to a prefix can be received at a step 406. Once the opaque label is generated for the IP packet, the IP packet is forwarded out of a network equipment of the content distribution system based on the opaque label at a step 408, where the opaque label corresponds to the egress interface of the network equipment that directly leads to the autonomous system. The network equipment can store a mapping between the opaque label and the egress interface.

Figure 5:
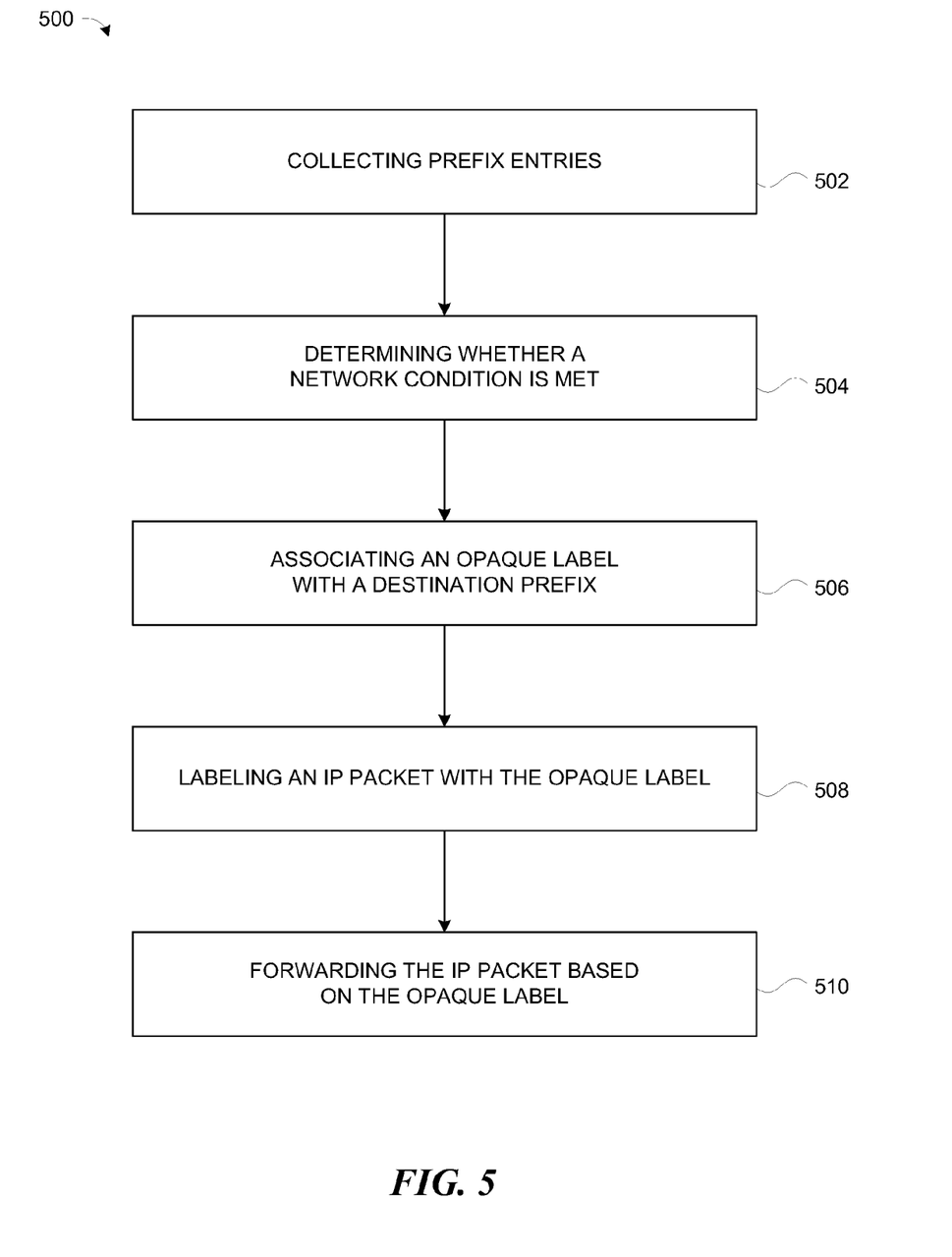
FIG. 5 illustrates a flow chart of a method of operating a content distribution system with server-controlled routing mechanism responsive to network conditionals.

FIG. 5 illustrates a flow chart of a method 500 of operating a network managed content distribution system, such as the content distribution system 202, with server-controlled routing mechanism responsive to network conditionals. The method 500 starts with a step 502 of collecting prefix entries from autonomous systems through a network equipment. The content distribution system can determine whether a network condition is met by monitoring network traffic, such as outgoing network traffic, at a step 504. Monitoring network traffic includes determining how much traffic is going through each egress port of a network equipment. Monitoring network traffic also includes determining how much traffic is sent to each prefix of the prefix entries. The network condition can be a network utilization of one of the autonomous systems over a pre-defined threshold.

An opaque label is then associated with a destination prefix of the prefix entries based on the network condition at a step 506. By changing association of the opaque labels with destination prefixes, network traffic can be moved from a first autonomous system to a second autonomous system by associating the opaque label with the destination prefix where the opaque label corresponds to an egress interface of the network equipment connected to the second autonomous system. An IP packet destined for the destination prefix is then labeled with the opaque label at a step 508. The network equipment then forwards the IP packet based on the opaque label at a step 510.

The monitoring network traffic at the step 504 includes determining a traffic category coming from a host server connected to the network equipment. The opaque label can then be associated with the destination prefix specific for the host server with the traffic category. Then network traffic from the host server having the traffic category can then be moved via changing the opaque label associated with the destination prefix from an opaque label associated with a first autonomous system to an opaque label associated with a second autonomous system, with the second autonomous system having a lower latency than the first autonomous system.

Figure 6:
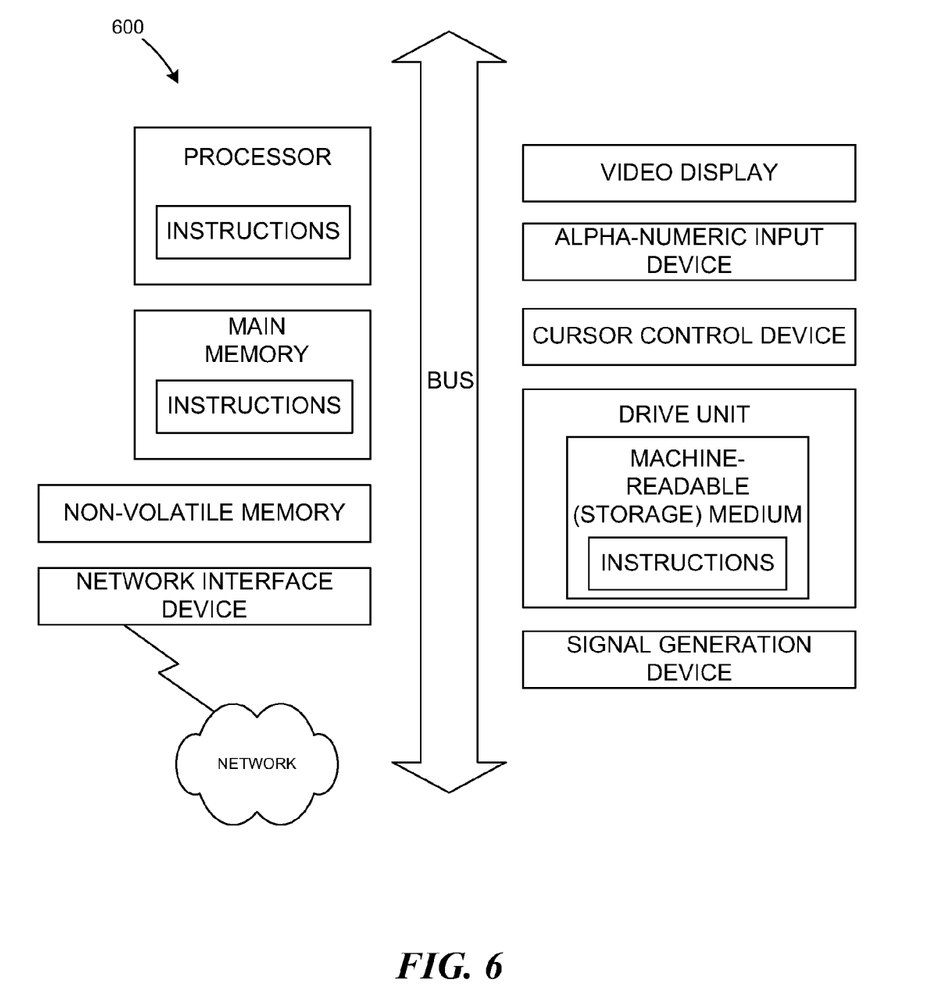
FIG. 6 is a diagrammatic representation of a machine in the example form of a computer system within which a set of instructions, for causing the machine to perform any one or more of the methodologies or modules discussed herein, may be executed.

Referring now to FIG. 6, therein is shown a diagrammatic representation of a machine in the example form of a computer system 600 within which a set of instructions, for causing the machine to perform any one or more of the methodologies or modules discussed herein, may be executed.

In the example of FIG. 6, the computer system 600 includes a processor, memory, non-volatile memory, and an interface device. Various common components (e.g., cache memory) are omitted for illustrative simplicity. The computer system 600 is intended to illustrate a hardware device on which any of the components depicted in the examples of FIGS. 1-3B (and any other components described in this specification) can be implemented. The computer system 600 can be of any applicable known or convenient type. The components of the computer system 600 can be coupled together via a bus or through some other known or convenient device.

This disclosure contemplates the computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 600 may include one or more computer systems 600; be unitary or distributed; span multiple locations; span multiple machines; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 600. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 600. The interface can include an analog modem, ISDN modem, cable modem, token ring interface, satellite transmission interface (e.g., "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 6 reside in the interface.

In operation, the computer system 600 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within registers and memories of the computer system into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies or modules of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The above description and drawings are illustrative and are not to be construed as limiting the invention to the precise forms disclosed. Persons skilled in the relevant art can appreciate that many modifications and variations are possible in light of the above disclosure. Numerous specific details are described to provide a thorough understanding of the disclosure. However, in certain instances, well-known or conventional details are not described in order to avoid obscuring the description.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

As used herein, the terms "connected," "coupled," or any variant thereof when applying to modules of a system, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

Those of skill in the art will appreciate that the invention may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

While processes or blocks are presented in a given order, alternative embodiments may perform routines having steps, or employ systems having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. Any claims intended to be treated under 35 U.S.C. §112, ¶6 will begin with the words "means for". Accordingly, the applicant reserves the right to add additional claims after filing the application to pursue such additional claim forms for other aspects of the disclosure.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non transitory, tangible computer readable storage medium and may include any embodiment of a computer program product or other data combination described herein.

The language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
 collecting prefix entries from an autonomous system;
 receiving, at a host server, a content request to send digital content to a prefix;
 generating, at the host server, an opaque label for an Internet Protocol (IP) packet of a message responsive to the prefix indicated by the content request being listed in the prefix entries collected from the autonomous system, wherein the opaque label corresponds to the autonomous system and is based on the prefix of the content request; and
 forwarding the IP packet out of an egress interface of a network equipment, the egress interface corresponding to the opaque label.

2. The method of claim 1, wherein the opaque label corresponds to the egress interface of the network equipment directly connected to the autonomous system.

3. The method of claim 1, further comprising storing the prefix entries offline from the network equipment.

4. The method of claim 1, wherein the network equipment stores a mapping between the opaque label and the egress interface.

5. The method of claim 1, wherein collecting the prefix entries includes collecting the prefix entries via a route collection service transparent to the network equipment.

6. The method of claim 1, wherein collecting the prefix entries includes collecting a full Internet routing table indicating the autonomous system as a default route to reach the prefix.

7. A method, comprising:
 collecting prefix entries through a network equipment;
 determining whether a network condition is met by monitoring outgoing network traffic;
 associating an opaque label with a destination prefix in the prefix entries based on the network condition;
 labeling, at a host server, an Internet Protocol (IP) packet destined for the destination prefix with the opaque label that corresponds to an autonomous system when the destination prefix is listed in the prefix entries as corresponding to the autonomous system; and
 forwarding the IP packet at the network equipment based on the opaque label.

8. The method of claim 7, wherein monitoring the outgoing network traffic includes:
 providing a traffic sampling service on the host server to sample traffic from the destination prefix; and
 pairing the prefix entries with the sampled traffic to determine how much data is sent to the destination prefix from the host server.

9. The method of claim 8, wherein associating the opaque label with the destination prefix includes:
 selecting the destination prefix responsible for a traffic flow through a first autonomous system based on how much data is sent to the destination prefix; and
 selecting the opaque label corresponding to a second autonomous system as the autonomous system that can reach the destination prefix and has a lower latency than the first autonomous system.

10. The method of claim 9, wherein associating the opaque label with the destination prefix is programmed to a portion, less than all, of host servers connected to the network equipment, wherein the host servers serve traffic to the destination prefix.

11. The method of claim 7,
 wherein monitoring the outgoing network traffic includes estimating a first bandwidth utilization percentage of a first autonomous system and a second bandwidth utilization percentage of a second autonomous system from the network equipment; and
 wherein the network condition is whether the first bandwidth utilization percentage is beyond a pre-defined threshold.

12. The method of claim 11, wherein associating the opaque label includes moving traffic from the first autonomous system to the second autonomous system when the second bandwidth utilization percentage is lower than the first bandwidth utilization percentage and when the second autonomous system has bandwidth available to take the traffic.

13. The method of claim 7, wherein associating the opaque label includes moving traffic from a first autonomous system to a second autonomous system by selecting a new opaque label to associate with the destination prefix, the new opaque label corresponding to an egress interface of the network equipment connected to the second autonomous system.

14. The method of claim 7,
 wherein monitoring the outgoing network traffic includes determining a traffic category coming from the host server connected to the network equipment; and
 wherein associating the opaque label includes:
 associating the opaque label with the destination prefix specific for the host server; and
 moving traffic from a first autonomous system to a second autonomous system based on the traffic category, the second autonomous system having a lower latency than the first autonomous system.

15. A network fabric system, comprising:
 a network equipment to interface between a network fabric and one or more neighboring autonomous systems, the network equipment having egress ports connected to the one or more neighboring autonomous systems;
 a host server coupled to the network equipment;
 non-transitory memory storing service modules; and
 one or more processors for executing the service modules, the service modules including:
 a route collection module, coupled to the network equipment, configured to collect prefix entries, each of the prefix entries associated with an autonomous system connected via an egress port of the network equipment; and
 a traffic engineering module configured to associate an opaque label to a prefix identified in the prefix entries, the opaque label associated with the egress port;
 wherein the host server is configured to assign the opaque label to an outgoing IP packet based on a content request from the prefix associated with the opaque label; and
 wherein the network equipment is configured to forward the outgoing IP packet through the egress port that matches the opaque label of the outgoing IP packet according to the traffic engineering module.

16. The network fabric system of claim 15, wherein the traffic engineering module is configured to change the opaque label associated with the prefix based on satisfaction of a network condition in the network fabric.

17. The network fabric system of claim 15, further comprising a prefix storage, wherein the route collection module stores the prefix entries on the prefix storage, the prefix entries including a local full Internet routing table.

18. The network fabric system of claim 15, wherein the service modules include a traffic sampling module, coupled to the host server, configured to sample outgoing traffic from the host server sent to the prefix entries.

19. The network fabric of claim 18, wherein the service modules include a data aggregation module, coupled to the traffic sampling module, configured to pair each prefix of the prefix entries with sampled traffic to determine how much data is sent to each prefix to determine whether a network condition is met; and    wherein the traffic engineering module is configured to associate a different opaque label to the prefix when the network condition is met.

20. The network fabric of claim 15, wherein the service modules includes a network monitor module configured to determine how much data is sent to each of the one or more neighboring autonomous systems; and    wherein the traffic engineering module is configured to select the opaque label based on how much data is sent to each of the one or more neighboring autonomous systems.

\* \* \* \* \*